Figure 1:
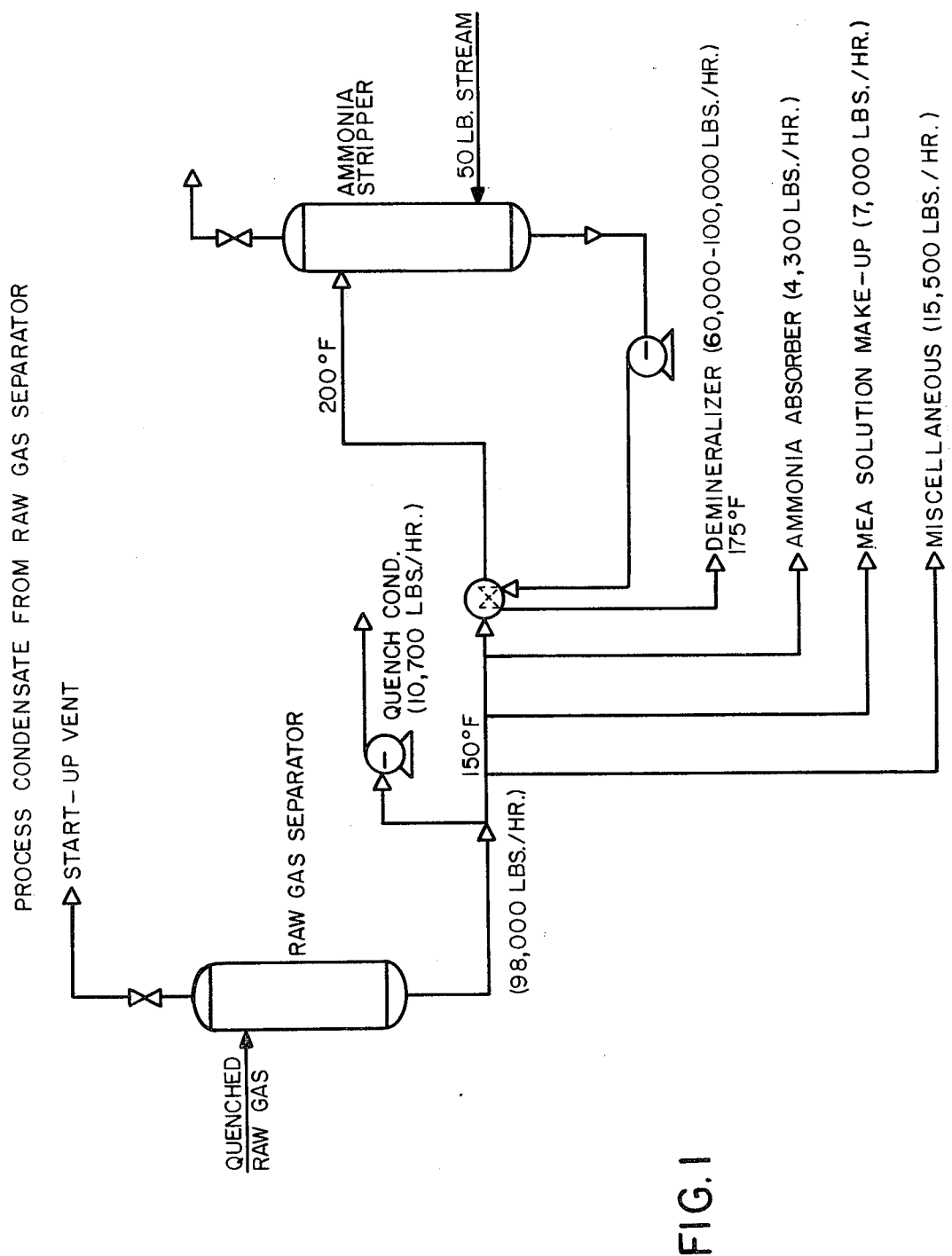

United States Patent

Roensch

Patent Number: 4,464,228
Date of Patent: Aug. 7, 1984

[54] ENERGY CONSERVATION WITHIN THE KELLOGG AMMONIA PROCESS

[75] Inventor: L. Fred Roensch, Naperville, Ill.

[73] Assignee: Nalco Chemical Company, Oak Brook, Ill.

[21] Appl. No.: 445,327

[22] Filed: Nov. 29, 1982

[51] Int. Cl.³ ............................................. B01D 3/34
[52] U.S. Cl. ..................................... 203/49; 210/750
[58] Field of Search ........................... 210/750; 203/49

[56] References Cited

U.S. PATENT DOCUMENTS 1,307,739  6/1919  Jones ................................. 203/49 X
3,970,739  7/1976  Shiraishi et al. ................. 210/750 X
4,002,565  1/1977  Farrell ................................. 210/750

Primary Examiner—Thomas G. Wyse
Attorney, Agent, or Firm—John C. Premo; Robert A. Miller; Donald G. Epple

[57] ABSTRACT

A method of stripping volatile contaminants from ammonia plant process condensate and recovering a stripped process condensate and using same as a high quality makeup water for operating units within the ammonia process which comprises:

(a) feeding ammonia plant process condensate to the upper stages of an evaporative stripping tower equipped with a collection basin, and
(b) allowing said condensate to flow downwardly against an upward flow of air, and
(c) operating the evaporative stripping tower in at least a once-through manner, and
(d) collecting the stripped process condensate in the evaporative tower collection basin, and
(e) recovering the stripped process condensate from the evaporative tower basin, and
(f) reusing this stripped process condensate as water makeup for other process operating units.

12 Claims, 4 Drawing Figures

ONCE-THROUGH EFFICIENCY
AS A FUNCTION OF
CONCENTRATION & TIME

ENERGY CONSERVATION WITHIN THE KELLOGG AMMONIA PROCESS

INTRODUCTION

Ammonia is a principal source of nitrogen for the fertilizer industry today. It ranks as the nation's largest volume petrochemical with a consumption of ammonia based fertilizer alone growing worldwide at an average rate of approximately 12% per year. In addition to fertilizers, ammonia is increasingly being used for numerous other industrial purposes including the manufacture of nylon, acrylonitrile, polyurethane foams, urea-based plastics, hydrazine, nitric acid, and nitrate explosives.

Presently, about 75% of the synthetic ammonia manufactured in the United States of America uses the Kellogg ammonia process. This process takes natural gas as a raw material, steam reforms this natural gas to recover hydrogen, then reacts hydrogen with nitrogen from the air under iron catalysis and at high temperatures and pressures to synthesize ammonia. Side processes within the Kellogg process oxidize carbon monoxide or carbon to carbon dioxide.

The new Kellogg process combines several thermal processes into a single operating unit permitting efficient reforming and energy utilization while still affording reductions in labor and operating costs. While the new Kellogg process is quite a bit more energy efficient than existing processes, certain improvements can be made to accomplish the needs of the process while still decreasing the energy consumption during the operation of the process.

One of these areas of improvement is the subject of this invention.

In the existing process, an aqueous stream referred to as "process condensate" from raw gas separators is stripped of ammonia and methanol contaminants in a stripping tower which operates using 50 lb. steam fed to the bottom of said tower to accomplish the task of removing these volatile ammonia and methanol contaminants from this stream. Because this water stream is made up primarily of steam condensate and process condensate derived from prior process steps involving the formation of water, the water quality of the bottoms of this stripping tower is much improved over natural waters obtained from wells, rivers, lakes, and the like, except that these waters are contaminated with ammonia and by-products such as methanol.

After these process condensates are steam stripped of these contaminants, the water quality is extremely good. As a result, this water is currently used in additional processes which normally exist by necessity in the Kellogg ammonia process. For example, this water is often heat-exchanged with the feed to the same stripping tower and then fed directly to demineralizers which are preparing water for the boiler operation. As is well known, these demineralizers remove mineral content from boiler water feed so as to avoid scale buildup in the generation of steam within the boiler. If the water quality of feed to the demineralizers is enhanced by decreasing inorganic contaminants and total dissolved solids (TDS), substantial savings in the operation of these demineralizers is realized.

In the drawings,

FIGS. 1-4 illustrate various features of the prior art and of the present invention.

FIG. 1 reviews current operation in the stripping of ammonia and methanol contaminants from process condensate coming from the raw gas separators existing in the Kellogg process for synthesizing ammonia. As can be observed, this stream stripping tower operates by feeding 50 pound steam directly into the bottom of this tower. Assuming an 85% boiler efficiency, the cost of operating this ammonia stripper using 50 lb. steam has been estimated at over $1,000,000 annually, when process condensate flows are of the order of 160 gallons/minute, a number which is found to exist in a Gulf Coast ammonia plant and a number which is exceeded in an ammonia plant found in the Southwest United States.

It would, therefore, be an advance in the art of operating the Kellogg ammonia process to discover a method of removing ammonia and methanol contaminants from process condensate which is less energy-intensive and which derives the same result in regards to the high quality water which is currently obtained in this direct steam-fed ammonia stripper tower.

It is, therefore, an objective of this invention to disclose operational parameters and equipment which may be used in place of the steam-operated ammonia stripper which derives similar results in regards to generation of high quality water while simultaneously minimizing or eliminating the cost of operating the ammonia stripper with steam. It is, also, an object of this invention to obtain high quality water from the process condensate which has been stripped of ammonia and methanol contaminants, and then reusing this high quality water in additional process units, either within or without the Kellogg process. It is, also, an objective of this invention to reuse the high quality stripped process condensate water as feed to cooling towers which may then be operated using a corrosion inhibition system operating at an [M] alkalinity[1] of at least 300 and allowing the cooling tower to be operated at increased concentration factors.

[1] [M] alkalinity is defined as the total concentration, measured as ppm of $CaCO_3$ of all carbonate and bicarbonate anions.

THE INVENTION

I have discovered a method of stripping volatile contaminants from ammonia plant process condensate and recovering a stripped process condensate for reuse as a high quality makeup water for operating units within the ammonia process which comprises:

(a) feeding ammonia plant process condensate to the upper stages of an evaporative stripping tower equipped with a collection basin, and (b) allowing said ammonia plant process condensate to flow downwardly against an upward flow of air, and (c) operating the evaporative stripping tower in at least a once-through manner, and (d) collecting the stripped process condensate in the evaporative tower collection basin, and (e) recovering this stripped process condensate from the evaporative tower basin, and (f) reusing this stripped process condensate as water makeup for other process operating units.

The volatile contaminants found in ammonia plant process condensate are most often ammonia and methanol. The ammonia plant process condensate normally comes from the raw gas separator within an ammonia plant and is normally stripped as outlined above in a steam operated ammonia stripping tower generating high quality water in the bottoms which may be used in other plant processes where such high quality water is advantageous, such as demineralizer makeup water, cooling tower makeup water, and low pressure boiler makeup water.

The evaporative stripping tower is normally equipped with a collection basin from which stripped condensate may be pumped to other operating units where high quality water is advantageous. However, a portion of this stripped condensate may also be recirculated as make-up water to the evaporative stripping tower and combined with ammonia plant process condensate, then fed directly to the upper stages of the evaporative stripping tower. This type of recirculation improves the quality of stripped process condensate waters recovered from the basin of the evaporative stripping towers. The evaporative stripping tower may be designed in a similar fashion to cooling towers used for heat exchange purposes, and, in fact, such heat exchange cooling towers may be directly substituted for the evaporative stripping towers of this invention. These evaporative stripping towers may be of a counter-flow or cross-flow design. When the evaporative stripping tower is designed as a cooling tower, the recirculated makeup water from the basin may be used as the cooling medium in heat exchange equipment before recirculation to the tower.

Evaporative Stripping Tower

As mentioned above, the evaporative stripping tower may be designed originally as a heat exchanging cooling tower and such cooling towers may be substituted for the evaporative stripping cooling tower of this invention. The operation of these evaporative stripping cooling towers can be predicted in regards to the concentration of a contaminating volatile species on the basis of Equation 1, presuming a counter-flow design.

$$C_B = \left[\frac{MC_M}{(-R_f(1 - EFF) + R_a + B)}\right] +$$

$$\left[C_{B_o} - \frac{MC_M}{(-R_f(1 - EFF) + R_a + B)}\right] exp. -$$

$$\left[\frac{-R_f(1 - EFF) + R_a + B}{V}\right] t$$

Equation 1

In Equation 1, $C_B$ is the concentration of the volatile component in the blowdown waters being pumped from the evaporative tower basin.

$C_m$ is the concentration of this volatile component in the makeup waters to the evaporative stripping tower. Normally, this would be the concentration of this contaminating volatile component found in the process condensate from the ammonia process.

M is the flowrate of the makeup waters.

B is the blowdown rate from the stripping tower basin.

$R_o$ is the recirculation rate from the basin of the evaporative stripping tower back to the upper stages of the evaporative stripping tower in the form of a recycle stream. $R_o$ may be about 0, which indicates a once-through operational flow rate, meaning that no recirculation of stripped condensate found in the basin of the tower is made back to the feed to the upper stages of the tower. $R_o$ may also be a large flowrate returning a substantial portion of waterflow from the basin back to the upper stages of the evaporative stripping tower. When the value of $R_o$ is high, Equation 1 predicts that the concentration of the volatile component in the stripped process condensate found in the basin of this evaporative stripping tower will be decreased. Depending upon the need of downstream process units regarding the concentration of these volatile components, one can then readily control the recirculation rate, $R_o$, required to obtain the water quality necessary for downstream process units.

$R_f$ is the difference between $R_o$ and any evaporative loss occuring in the evaporative stripping tower. These evaporative losses normally run between 1 and 10 volume percent, so that $R_f$ is normally between 90–99 per cent of $R_o$.

B is the rate of blowdown coming from the basin of the evaporative stripping tower and being used in downstream process units.

The term, "Eff," is a once-through efficiency for removal of a particular volatile component from the feed waters to this evaporative stripping tower. Table I indicates a theoretically expected once-through ammonia stripping efficiency relative to the tower height necessary to accomplish the indicated once-through stripping efficiency for ammonia in this ammonia process condensate.

Finally, V is the total system volume operating within the evaporative stripping tower and its basin, and T is the time which is normalized to the flowrate units used, i.e., if flowrates are indicated in gallons/minute, the time in Equation 1 will also be in minutes.

Interestingly, the expected once-through efficiencies indicated in Table I shows that the tower height required to strip 70% of the contaminating volatile ammonia species is only 6.1 feet using a once-through operational manner. Eighty per cent of ammonia is expected to be stripped using once-through operations with no recycle of basin water to the upper stages of the evaporative stripping tower if the tower is but 10 feet in height. Most preferably, however, the tower will be at least 20 feet in height and will be stripping ammonia at an efficiency of about 90%, again as demonstrated in Table I. As Equation 1 predicts, if a portion of the basin waters is recycled, the stripping efficiency would increase so that plant operators can control the quality of basin waters collected by controlling the percentage of water recycled to the upper stages of the evaporative stripping tower.

TABLE I

| Expected Once-Through Ammonia Stripping Efficiency | Tower Height |
|---|---|
| 0% | 0.0 feet |
| 10% | 0.3 feet |
| 20% | 0.7 feet |
| 30% | 1.1 feet |
| 40% | 1.8 feet |
| 50% | 2.6 feet |
| 60% | 3.9 feet |
| 70% | 6.1 feet |
| 80% | 10.3 feet |
| 90% | 22.3 feet |
| 95% | 44.1 feet |
| 100% | ∞ feet |

It is, therefore, preferred that the evaporative stripping tower be at least 10 feet in height when it is of counter-flow design or the equivalent height when this tower is of cross-flow design. It is most preferred that this evaporative stripping tower be at least 20 feet in height if counter-flow or the equivalent in height if cross-flow so as to accomplish a stripping efficiency for ammonia of at least 80%, and preferably of at least 90%, using a once-through operational manner. As Equation 1 predicts, any proportion of waters recovered from the basin of this evaporative stripping tower may be recycled back to the feed to the upper stages of this same tower to accomplish a higher ammonia stripping efficiency, thereby lowering the expected concentration of ammonia contaminants in the recovered basin waters. The same expectation exists for any volatile contaminating species existing in this ammonia process condensate, such species, for example, including not only ammonia but also methanol.

The ammonia plant process condensate could be fed to the basin of this evaporative stripping tower and then recycled back to the upper stages of this tower. However, this operation would not give the most efficient removal of the contaminating species. Therefore, it is preferred that the ammonia process condensate contaminated stream be fed to the upper stages of this evaporative stripping tower. By upper stages, we infer that the feed stream be fed into the top of this evaporative stripping tower no farther down the tower height than the upper 20% in this height. It is most preferred that the ammonia plant process condensate is fed to the evaporative stripping tower within the upper 20% of said tower's overall height. As an example, if one designed an evaporative stripping tower which was 20 feet in height, it would be preferred that the ammonia plant process condensate be fed to the upper stages of this tower within 4 feet of the top of the tower. It is most preferred that the ammonia plant process condensate be fed directly to the top of this evaporative stripping tower. Normally, the ammonia plant process condensate would have a pH above 7.5. This improves the efficiency of ammonia removal. If other waters are used for makeup, it is preferred that the pH within the tower be maintained at a level of at least 7.5.

The benefits of the operation outlined above can be readily observed. Not only is the ammonia and methanol removed from this process condensate from the raw gas separators within the Kellogg ammonia process, but also the water quality recovered from the basin of this evaporative stripping tower easily matches and may surpass the water quality obtained from the steam stripping towers currently used in this process. At the same time, over $1,000,000 annually is saved by operating the evaporative stripping towers of this invention as compared to the steam stripping tower currently used in the industry.

Reuse of Stripped Process Condensate

This invention allows the inexpensive removal of ammonia and methanol contaminants from ammonia process condensate and the recovery in the basin of the evaporative stripping tower described above of a stripped process condensate of high water quality containing extremely low dissolved solids, little or no ammonia or methanol contamination, and little or no total organic carbon. The recovered stripped process condensate may then be used in process units requiring high quality water within another plant process, either within the ammonia plant or in any other plant process being operated within the same geographical area.

Such units include the demineralizer unit which is preparing water to be used as feed for steam generation. As is well known, boilers which are generating steam require a feed water of extremely high quality containing little or no dissolved or suspended solids and, preferably, containing minimum quantity of other dissolved species such as ammonia, methanol, and other organic compounds. Since the quality of water recovered from the basin of the stripping towers described above is easily the same as that recovered from the steam strippers currently used, this water is preferably fed directly to the demineralizers which prepare water as feed to boilers operating to generate the steam requirements of the Kellogg ammonia process.

It is, therefore, a preferred method of this invention that the stripped process condensate is recovered from the basin of the evaporative stripping towers and reused as process makeup water for the demineralizers preparing boiler quality water for steam generation.

Another preferred operation of this invention is to recover the stripped process condensate and reuse this high quality stripped process condensate water as makeup water for cooling towers operating within the ammonia plant process for the purpose of heat exchange. The use of this high quality stripped process condensate as make-up water to cooling towers within the ammonia process permits improved operation of these towers using corrosion control treatments, permitting operation of these towers at an [M] alkalinity of at least 300. Additionally, the use of this high quality stripped process-condensate water as makeup water for cooling towers may also permit these cooling towers to be operated at a concentration factor above those normally expected, thereby conserving additional energy and conserving additional water normally used in the operation of these cooling towers and deriving economic savings in utilities and acid costs.

The Kellogg ammonia plant operator can then benefit by the simultaneous use of the stripped process condensate water in either the demineralizer which is preparing boiler quality water for steam generation or he may benefit by the use of this high quality stripped process condensate water as makeup water for cooling towers operating at much higher concentration factors than normally available and at higher [M] alkalinities than normally observed. This allows the use of fewer chemical treatments, controlling corrosion rates within the cooling system. The use of these high quality stripped ammonia process condensate waters allows the concentration factor of a cooling tower to be increased by at least one concentration factor and preferably by at least 2 to 3 concentration factors or more depending on water quality of other waters used to make up the water volume of each cooling tower.

The use of these stripped process condensate waters as cooling tower feed is particularly important when the ground waters, river waters, or industrial water sources would normally supply an industrial water which has high dissolved solids, high concentrations of hardness ions, or other factors which create corrosion, scaling, or deposition problems within the cooling system.

To better illustrate the invention, the following examples are presented.

EXAMPLES

EXAMPLE 1

Figure 2:
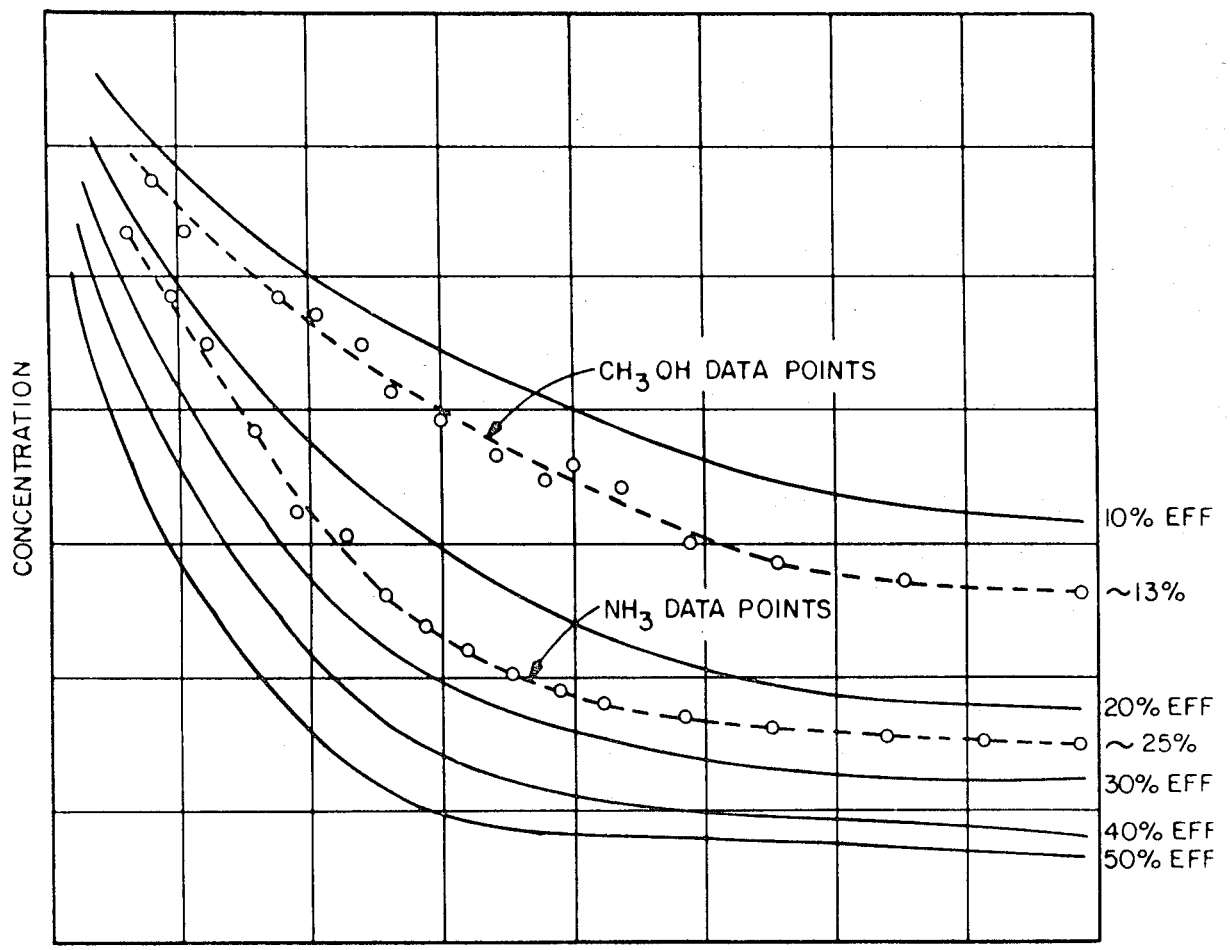

A pilot evaporative stripping tower was built in the laboratory. This stripping tower contained 1.0 fact of tower fill and was designed to obtain an initial feed to the top of the tower and a collection basin equipped with both recycling pumps and blowdown pumps. FIG. 2 demonstrates the concentration vs. time curves generated with both methanol and ammonia when operating this pilot stripping tower in a once-through manner. The actual data points illustrated in FIG. 2 are compared and superimposed upon theoretical once-through efficiencies expected for volatile components as a function of concentration and time. As can be seen, methanol and ammonia are both easily stripped at 13% and 25% once-through efficiency in the pilot cooling tower.

Since the pilot cooling tower was about 1 ft. in height, we can expect from the data generated and presented in Table I that the once-through efficiency will increase with tower height.

EXAMPLE 2

Figure 3:
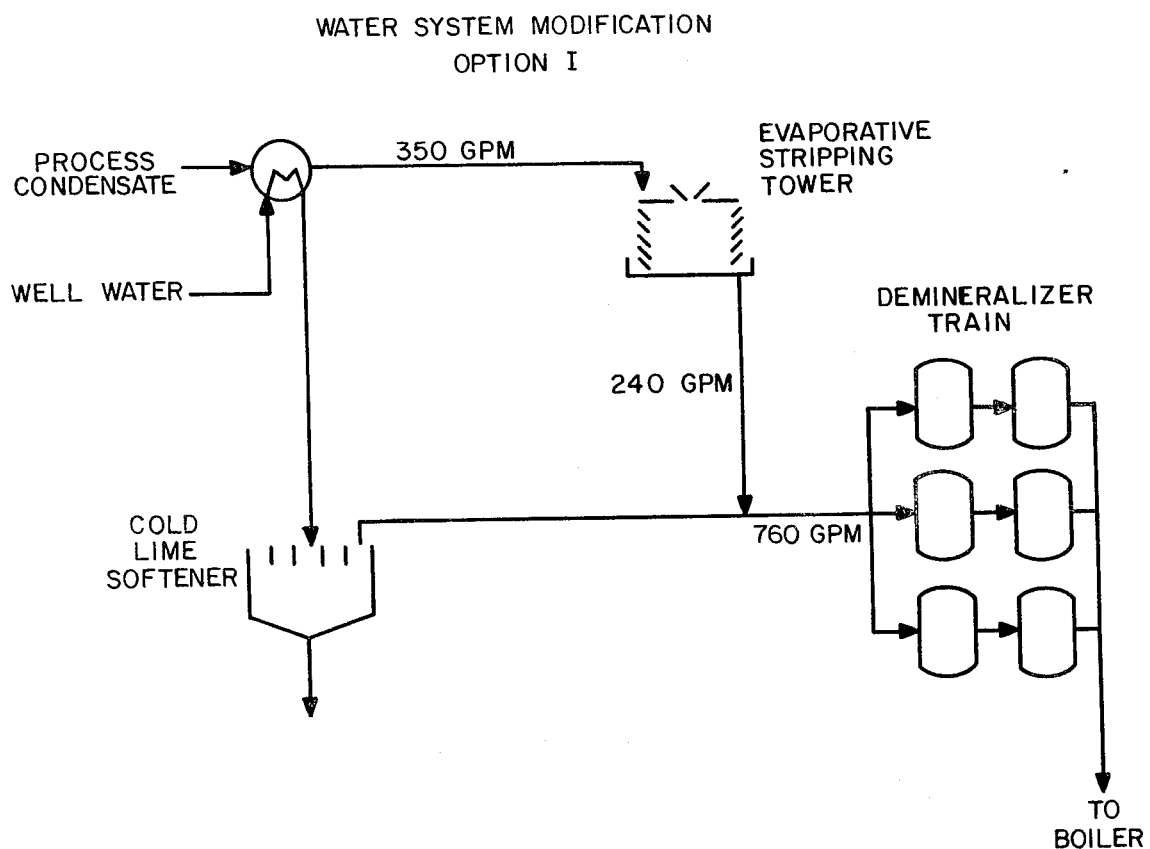

If one were to obtain in ammonia process condensate stream of about 350 gallons/minute, one could expect to operate an evaporative stripping tower which eliminates contaminate ammonia and methanol according to the operation diagrammed in FIG. 3. In FIG. 3, a process condensate of 350 gallons/minute is added to an evaporative stripping tower and 240 gallons/minute is recovered from the basin of this evaporative stripping tower and added to the feed waters to a demineralizer train preparing feed waters for boiler operation and steam generation. The difference between these volumes would be a combination of recycle rates and evaporative rates. As can be seen in this example, it is anticipated that well water is obtained as industrial waters to initially cool the process condensate. These well waters, or any waters from an industrial water source, could be softened and used as additional makeup waters to the demineralizer train. The use of the operation suggested in Example 2 would save approximately $450,000 annually in the operation of a stripping unit within the Kellogg ammonia process when costs saved include energy savings as well as reduced costs of operating the demineralizers because of improved water make-up to these units.

EXAMPLE 3

Figure 4:
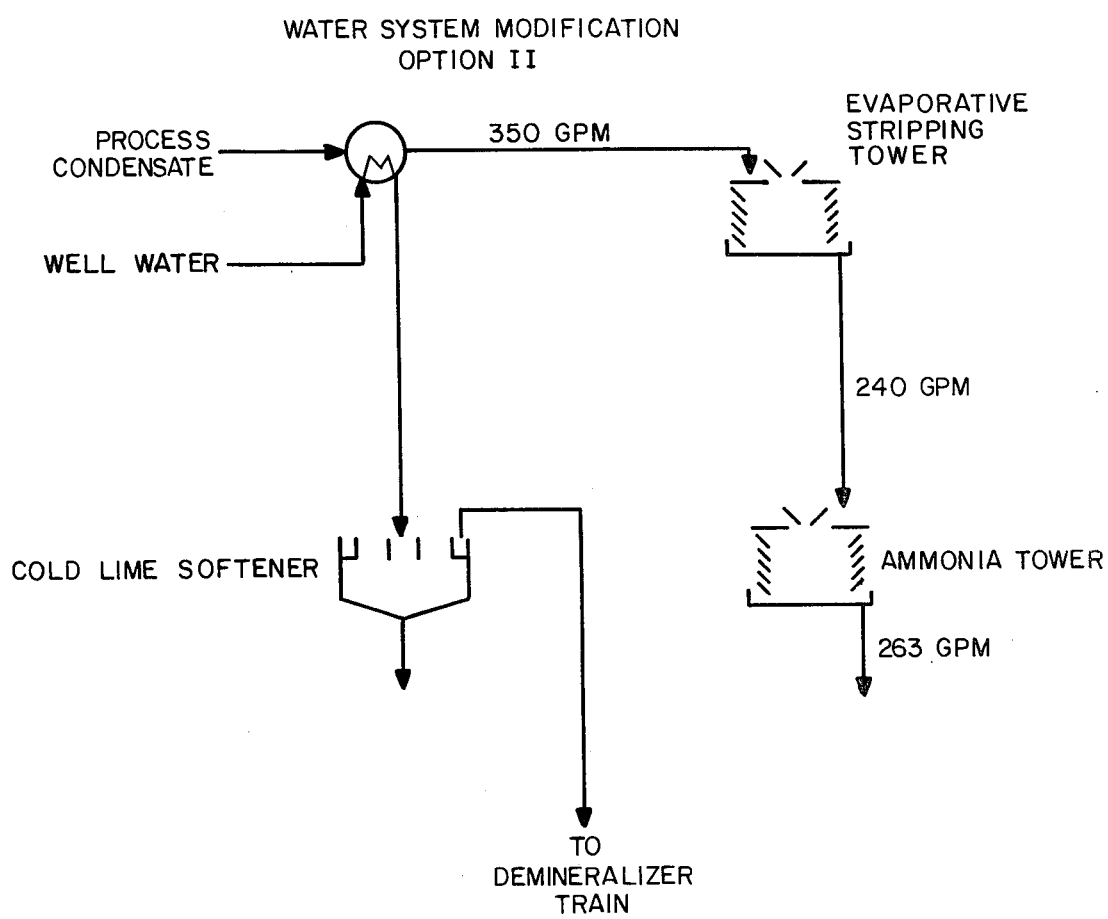

If an ammonia process condensate stream of 350 gallons/minute were treated in an evaporative stripping tower operated according to FIG. 4, it would be expected that approximately 240 gallons/minute of high quality makeup water could be added to an ammonia process cooling tower operating at an [M] alkalinity of at least 300 and an improved concentration factor. Energy savings would be in excess of $140,000 annually, savings from reduced use of industrial waters would be expected to be in excess of $20,000 annually, and savings in chemical costs for treatment of cooling waters within the ammonia cooling system would be approximately $60,000 annually if this system were operating at only a concentration factor of 5, an improvement over existing operations. It is expected that the system could be operated at concentration factors in excess of 5 which would save additional chemical costs.

Having described my invention, I claim:

1. A method of stripping volatile contaminants from ammonia plant process condensate and recovering a stripped process condensate and using same as a high quality makeup water for operating units within the ammonia process which comprises:

(a) feeding ammonia plant process condensate to the upper stages of an open evaporative stripping tower equipped with a collection basin, and
   (b) allowing said condensate to flow downwardly against an upper flow of air, and
   (c) operating the evaporative stripping tower in at least a once-through manner, and
   (d) collecting the cooled stripped process condensate in the evaporative tower collection basin, and
   (e) recovering the stripped process condensate from the evaporative tower basin, and
   (f) reusing this stripped process condensate as water makeup for other process operating units.

2. The method of claim 1 wherein the evaporative stripping tower is at least 10 feet in height.

3. The method of claim 1 wherein the evaporative stripping tower is at least 20 feet in height.

4. The method of claim 1 wherein the ammonia plant process condensate is fed to the evaporative stripping tower within the upper 20% of said tower's overall height.

5. The method of claim 1 wherein the stripped process condensate is recovered from the evaporative tower collection basin and reused as process makeup water for demineralizers preparing boiler quality water for steam generation.

6. The method of claim 1 wherein the stripped process condensate is recovered from the evaporative tower collection basin and reused as process makeup water for cooling towers within another plant process.

7. The method of claim 6 wherein the cooling towers within another plant process are operating with recirculating water having an [M] alkalinity of at least 300.

8. The method of claim 1 wherein the stripped process condensate is recovered from the evaporative tower collection basin and reused as low pressure boiler makeup water.

9. In a process stripping ammonia and methanol contaminants from an ammonia plant condensate process water system, the improvement which comprises stripping said ammonia and methanol contaminants from said ammonia plant condensate process water by:

(a) feeding ammonia plant process condensate to the upper stages of an open evaporative stripping tower equipped with a collection basin, and
   (b) allowing said condensate to flow downwardly against an upward flow of air, and
   (c) operating the evaporative stripping tower in at least a once-through manner, and
   (d) collecting the cooled stripped process condensate in the evaporative tower collection basin, and
   (e) recovering the stripped process condensate from the evaporative tower basin, and
   (f) reusing this stripped process condensate as water makeup for other process operating units.

10. The method of claim 9 wherein the stripped process condensate is recovered and reused as process makeup water for the demineralizers preparing boiler quality water for steam generation.

11. The method of claim 9 wherein the stripped process condensate is recovered and reused as process makeup water for cooling towers operating within another plant process.

12. The method of claim 11 wherein the cooling towers within another plant process are being operated with recirculating waters having an [M] alkalinity of at least 300.

* * * * *